United States Patent
Harris

(10) Patent No.: US 8,374,635 B2
(45) Date of Patent: Feb. 12, 2013

(54) METHOD FOR SELECTIVE PAGE CANCELLING IN AN ASYNCHRONOUS ENVIRONMENT

(75) Inventor: John M. Harris, Glenview, IL (US)

(73) Assignee: Motorola Mobility LLC, Libertyville, IL (US)

(*) Notice: Subject to any disclaimer, the term of this patent is extended or adjusted under 35 U.S.C. 154(b) by 334 days.

(21) Appl. No.: 12/396,498

(22) Filed: Mar. 3, 2009

(65) Prior Publication Data

US 2009/0270114 A1    Oct. 29, 2009

Related U.S. Application Data

(60) Provisional application No. 61/048,278, filed on Apr. 28, 2008.

(51) Int. Cl.
*H04W 68/00* (2009.01)
(52) U.S. Cl. .................................... 455/458
(58) Field of Classification Search ............ 455/458
See application file for complete search history.

(56) References Cited

U.S. PATENT DOCUMENTS

| 6,163,699 A | * | 12/2000 | Naor et al. .......... 455/453 |
| 2009/0017845 A1 | * | 1/2009 | Wu et al. .......... 455/458 |
| 2010/0197294 A1 | * | 8/2010 | Fox et al. .......... 455/422.1 |

FOREIGN PATENT DOCUMENTS

| EP | 1876850 A1 | | 1/2008 |
| EP | 2020819 A1 | | 2/2009 |
| WO | WO 2007/107121 | * | 9/2007 |

* cited by examiner

*Primary Examiner* — Jinsong Hu
*Assistant Examiner* — Jean Chang

(57) ABSTRACT

A method includes transmitting a paging request message to a plurality of asynchronous base stations (102*a-g*) where a paging message is sent within its respective cell at any time within a given paging interval (202). The method continues by receiving notification that paged mobile station (106) has responded to a paging message. The page cancelling message indicates to the base stations do not need to send the paging message within their respective cells during the current paging interval and that the paging process is cancelled.

12 Claims, 3 Drawing Sheets

US 8,374,635 B2

METHOD FOR SELECTIVE PAGE CANCELLING IN AN ASYNCHRONOUS ENVIRONMENT

FIELD OF THE INVENTION

The present invention relates generally to paging in wireless communication systems and, in particular, to cancelling paging messages before they are sent from asynchronous base stations.

BACKGROUND

As is known, wireless communication systems use base stations to send messages, including paging messages, to mobile stations that are located within cells. The paging messages are used to locate a mobile station within a system. A base station receives a paging request message from a page controller and sends out a paging message within the cell that it operates in an attempt to determine if the mobile station is in that cell. In some embodiments of synchronous paging, the plurality base stations send paging and repaging messages within their respective cells at the same time and at given time intervals until a the designated mobile station responds. Upon a response from the mobile station, the page controller of the wireless communications system does not send an additional paging and repaging request messages to the base stations. Thus, the paging for the mobile station ceases. In wireless communication systems including Code Division Multiple Access (CDMA), Time Division Multiple Access (TDMA) and Global System for Mobile Communications (GSM) the base stations are synchronous to one another. In other words, a paging message is sent from a plurality of base stations at the same time in order to locate a given mobile station at any given time. Newer and more advanced wireless communication systems such as CDMA2000, Wide Band CDMA (WCDMA) and Universal Mobile Telecommunication Systems (UMTS) also use synchronous base stations to send messages including paging messages to the mobile stations.

In order to overcome other issues related to the advancement of wireless communication systems, newer wireless communication systems such as Long Term Evolution (LTE) are considering using asynchronous base stations. In an asynchronous arrangement, the plurality of base stations send messages including paging messages to mobile stations at different times. Asynchronous base stations allow base stations to be deployed in locations where GPS signals are not available such as subway stations and in situations where it is difficult for base stations and mobile stations to be synchronized. In an asynchronous environment, the paging signals can be sent from different base stations at various different times. If the paging interval for a given paging area is 4 seconds, the paging message can be sent from any one of the asynchronous base stations within that 4 second paging interval, e.g. 0.5 sec., 1 sec., 1.5 sec. etc. up to the end of the interval.

As can be appreciated, a mobile station can respond to any of the paging messages sent by any of the base stations. If a mobile station responds to the paging message at the beginning of the paging interval, e.g. 0.5 sec. into the interval, base stations that are scheduled to send paging messages at the end of the interval will still be sending the paging message even after the mobile station has been located. These paging messages are not needed and they will not be responded to because the mobile station has been located.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
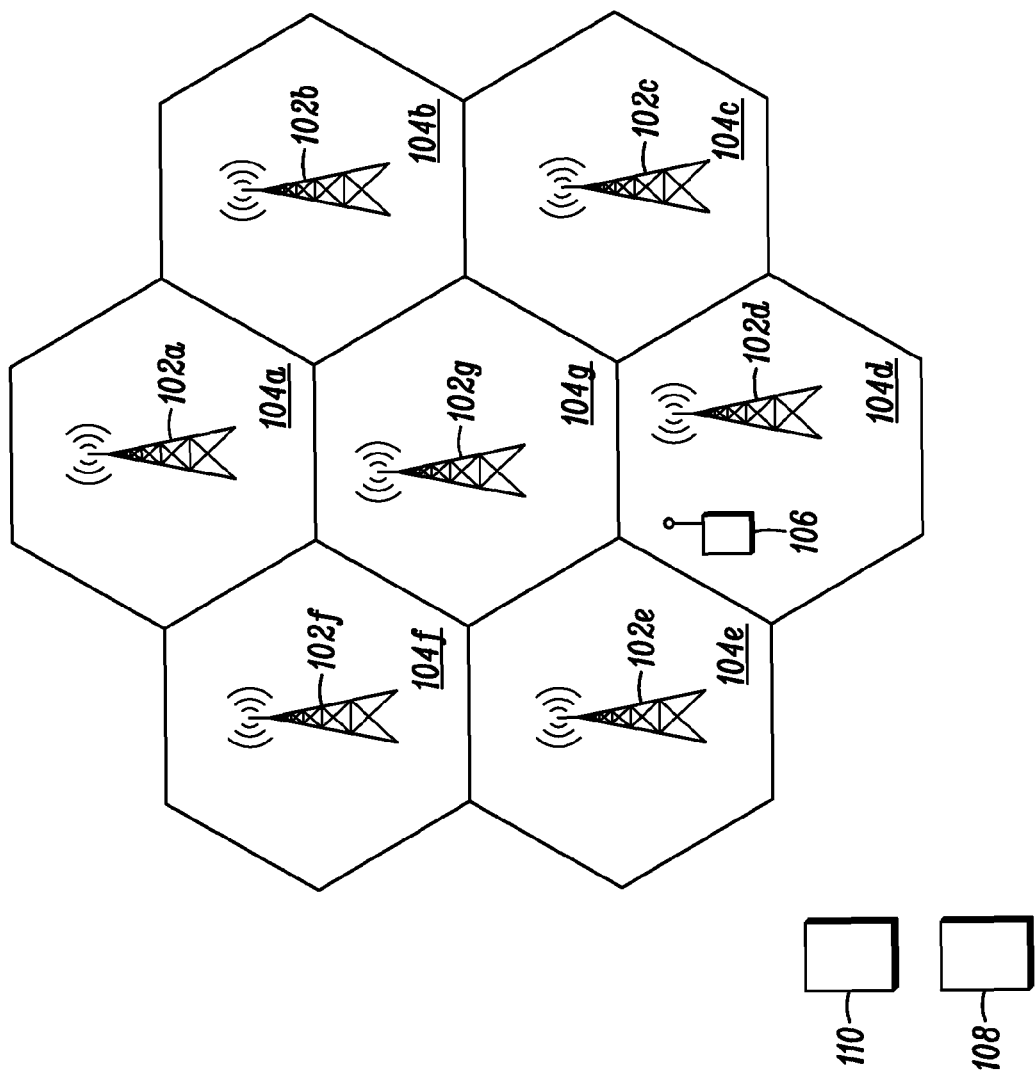
FIG. 1 is an example a wireless communication system in which the principles of the present invention can be found.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a method of selective page cancelling in an asynchronous environment. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein or which are not necessary for a complete understanding of the present invention.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of selective page cancelling in an asynchronous environment described herein. The non-processor circuits may include, but are not limited to, a radio receiver, a radio transmitter, signal drivers, clock circuits, power source circuits, and user input devices. As such, these functions may be interpreted as steps of a method to perform the claimed method of selective page cancelling in an asynchronous environment. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The present invention is directed to a method and an apparatus that performs the method that begins by transmitting a paging request message to a plurality of base stations. Each of the plurality of base stations are asynchronous to one another so that each base station can send a paging message within its respective cell at any time within a given paging interval. The method continues by receiving notification that paged mobile station has responded to a page message sent by at least one of the plurality of base stations. Thus, it is known within the system that the mobile station has been located in one of the cells. As the mobile station has been located, the method can conclude by transmitting a page cancelling message to the plurality of base stations in response to the notification. The page cancelling message indicates to the base stations that receive it that those base stations do not need to send the paging message within their respective cells during the current paging interval and that the paging process is cancelled and ceases. In an embodiment, there may be circumstances where even though the mobile station has been located the page cancelling message does not need to be sent to the remaining base station. In such a scenario, the page cancelling message occurs needs only to be sent when the notification is received within the first half of the interval of time. In another embodiment, the efficiencies from sending a page cancelling message to the plurality of base station is found when the paging area and the number of cells and base stations within a paging area of a certain size and is larger than a given threshold.

In another embodiment, the present invention is directed to a method and apparatus for performing that method that begins by receiving a page control message instructing at least one of a plurality of asynchronous base stations to send a paging message to a mobile station in an attempt to determine if the mobile station is within the cells of the asynchronous base stations. The paging messages can be sent at any time within the paging interval. Within the paging interval, the method for the plurality of asynchronous base stations can continue by receiving a page cancel message instructing the at least one of the plurality of asynchronous base station to cancel sending the paging message to the base station. In response to the page cancelling message, the method concludes by cancelling sending the paging message from the asynchronous base stations to the mobile station. In an embodiment, the step of the cancelling sending the paging message occurs when the page cancel message is received within less time than the time interval and within the first half of the time interval.

Turning to FIG. 1, a wireless communication system 100 is shown that support the principles of the present invention. The wireless communication system can be any of the known and developing technologies including LTE and others. The wireless communication system 100 includes a plurality of base stations, otherwise none as Node Bs, 102a-g that can each serve corresponding cells 104a-g, respectively. The number of base stations 102 and cells 104 can vary within different systems and within given areas depending on numerous factors. The cells 104a-g as shown are contiguous and do not overlap, but the principles of the present invention apply when the cells 104a-g overlap. In addition, a number of cells 104a-g can be configured into paging areas (not shown) in which paging messages are sent to locate a mobile station, or user equipment, 106. While mobile station 106 is shown in cell 104d in which base station 102d operates, the mobile station 106 can be located anywhere within the system 100.

The wireless communication system 100 also includes infrastructure elements that operate with and control the operations of the base station 102a-g in order that mobile stations 106 can operate within the system. The infrastructure elements include base station controller 108 and page controller 110. It is understood that other infrastructure elements are used within the system, but those elements are not needed to understand of the scope of the principles discussed here. In an embodiment, multiple base station controllers 108 are provided where each of the base station controllers 108 operates in conjunction with a subset of base stations 102a-g such as for the base stations 102a-g that control any given paging area. Moreover, the page controller 110, which is shown as a stand-alone element within the system, can be configured as a part of one or more of the base station controllers 108 or another infrastructure element not shown. In an LTE environment, the operations of the base station controller and the page controller can be performed by the Mobility Management Entity (MME) (not shown.) The MME is responsible for idle mode tracking of the mobile station or user equipment 106. As such, the MME is responsible for locating the mobile station or user equipment 106 using paging messages as described.

In accordance with the principles discussed, the base stations 102a-g are configured so that they are asynchronous to one another or, at a minimum, that at least one base station is asynchronous to the other base stations. As such, the base stations 102a-g are not configured so that each of the plurality of base stations 102a-g send the same messages, and in particular for this discussion paging messages, to mobile stations 106 at the same time. Thus within a given interval of time such as a paging interval, each of the plurality of base stations 102a-g send the message, e.g. paging message, at different times within the time interval. The paging messages can be sent at 0.5 sec. 1.0 sec, 1.5 sec., etc. within the paging interval. In contrast, each of a plurality of synchronous base stations would send the paging message at the same time within the paging interval. In an embodiment, the base stations can be configured into groups such that the base stations in one group are synchronous with one another yet the groups of base stations are asynchronous to one another.

Figure 2:
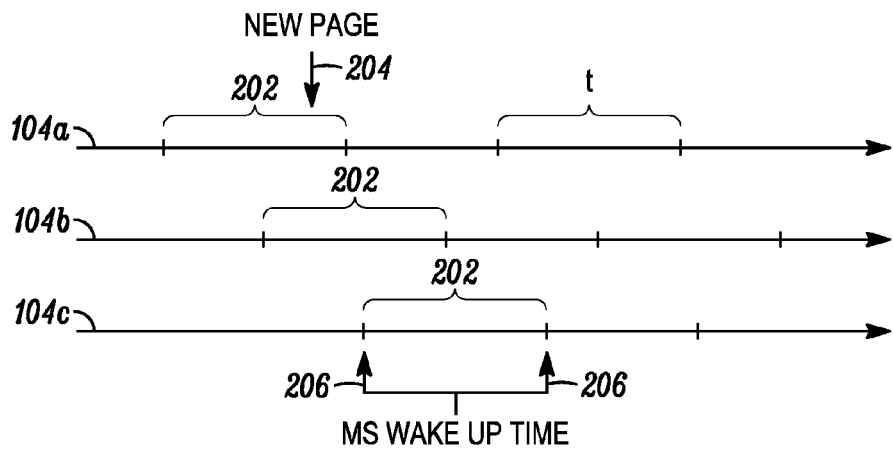
FIG. 2 is an schematic diagram of paging intervals for cells with asynchronous base stations in accordance with an embodiment of the present invention.

FIG. 2 illustrates a plurality of base stations 102a-c operating in cells 104a-c, for example, that arranged as asynchronous base stations and that send messages at different times within a time interval. Each cell 104a-c has a time interval and a paging interval 202a-c of a given length t. As seen, the paging intervals 202a-c have different start and stop times between the different cells 104a-c while the paging interval t is the same across all of the cells. It is understood, however, the paging interval t does not have to be the same across the cells for the principles described to operate.

As shown, a paging request message 204 can be received by the cells 104a-c at a given time. The page request message can be sent by the page controller 110 or the MME. The purpose of the page request message is to instruct the base station 102a-c to send a paging message within a paging interval to determine if the mobile station, which may be currently in idle mode, is located within any of the cells 104a-c. Page request message 204 is sent to the plurality of base stations 102*a-c* at the same time. As the base stations 102*a-c* are asynchronous to one another, the page request message can be received at different points within the paging intervals 202 for each of the cells 104*a-c*. In response to receiving the page request message, each of the asynchronous base stations 102*a-c* determines when within the paging interval it will send the paging message to determine if the mobile station is located within its cell 104*a-c*, respectively. The paging message may not be sent within the paging interval within which the page request message is received because there may not be enough time within that interval to send the message. Therefore, the paging message may be sent in the next time interval.

As is understood, the mobile stations or user equipment 106 is configured to wake-up at given intervals within the idle mode to determine if a paging message is being sent to it during a paging interval. The wake-up times 206 may be configured with any given interval such that one or more wake-up times 206 may occur in any given paging interval 202. As the base stations are asynchronous to one another, the mobile station 106 may be located in a given cell 104*a-c* at any time within that paging interval or in the next paging interval. Moreover, the mobile station 106 may not be located after the first sent paging messages are sent from the base stations 102*a-c* and a set of repaging messages may need to be sent. The base station 102*a-c* can be configured as being able to send or not send repaging messages and can be configured so that the repaging is base station based repaging. As soon as a paging message is received by a mobile station 106, the mobile station will respond. The mobile station's response can therefore be at any given time within the paging interval of any of the base stations 102*a-c*.

Since the base stations 102*a-g* are asynchronous, the paging messages sent by each of the plurality of base stations 102*a-g* will not be sent out to locate the mobile station 106 at the same time within any given paging interval 202 or within a next paging interval. Moreover, when a mobile station responds to the paging message thereby indicating which cell 104*a-g* it is located, the response also can occur at any time within a paging interval 202 or within a next paging interval. The mobile station's paging response can therefore be sent and the mobile station located in one of the plurality of cells 104*a-g* before the paging message or the next repaging message is sent by another of the base stations 102*a-g*. Thus, the scheduled paging or repaging messages can be sent by base stations even though the mobile station 106 has been located.

To avoid sending unnecessary paging messages, a page cancel message can be sent from the page controller 110 or MME to the base stations 102*a-g* when the page controller 110 or MME has received notification that the mobile station has been located in one of the cells 102*a-g*. Notification that the mobile station has been located is made when the mobile station sends a page response to one of the base stations 102*a-g* and that base station sends the appropriate messages to the page controller 110 or MME. Upon receiving the notification that the mobile station 106 has been located, there is no need to send additional paging messages even though they may have been scheduled by the asynchronous base stations 102*a-g*. Thus, a page cancelling message can be sent by the page controller 110 or MME to the base stations 102*a-g*. The page cancel message can include identifying information regarding the original page request message or the mobile station to which it relates. Upon receipt of the page cancelling message, the base stations 102*a-g* cancel the next scheduled paging or repaging message that is to be sent.

The benefit of sending the page cancelling message is that superfluous paging messages are not sent, which therefore conserves network resources. This is particularly true when the a page response is received in the beginning of paging interval and when there are a large number of cells or paging areas in which the paging message is sent. Therefore, when paging the mobile station with a paging interval t starting at time T, the page cancelling message can be sent to the base stations when a notification is received that the mobile station responded to the paging message within a threshold time less than the paging interval t after time T. In an embodiment, the paging cancelling message is sent when the notification is received of the mobile stations response within 50% of the paging interval. The benefits of the principles described are provided because most of the base stations 102*a-g* have sent the paging and repaging message within the first half of the paging interval. In an embodiment, the cancelling the paging message means that the second paging message or repaging message is not transmitted by the page controller 110 or MME and the first paging message only authorizes pages which can be transmitted in the first half of the paging interval. In paging areas that are relatively small, it is also not necessary to cancel the paging or repaging messages because most of those messages are sent within the beginning or first half of the paging interval.

Figure 3:
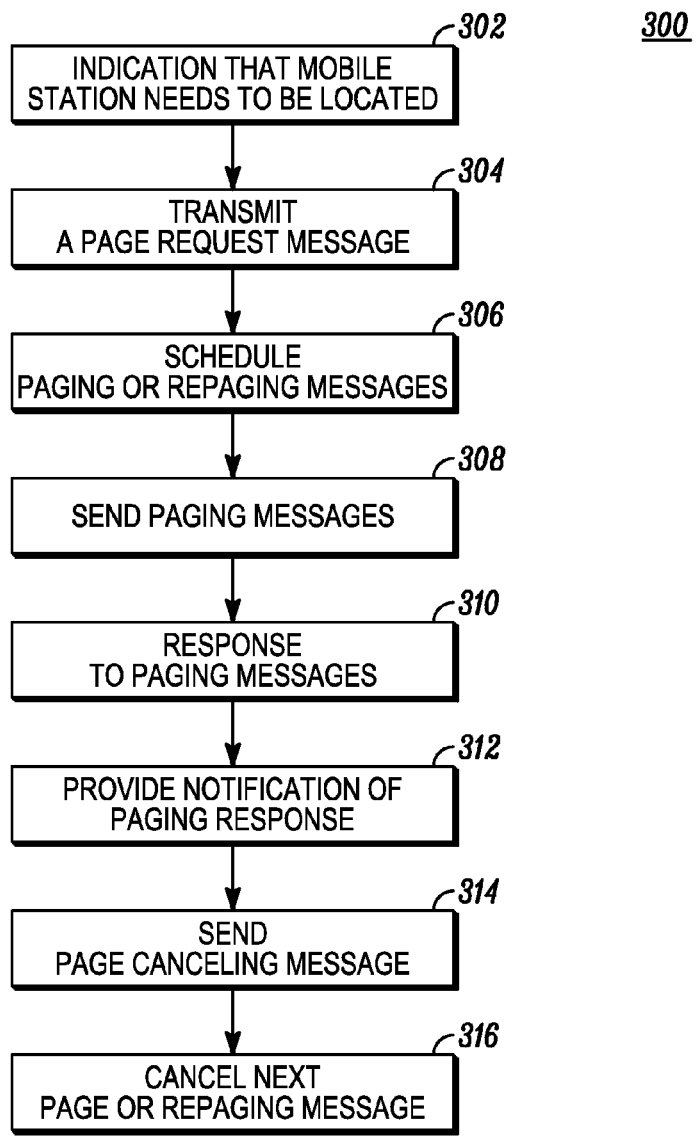
FIG. 3 is a flow chart illustrating the operations of a method pursuant to an embodiment of the present invention.

FIG. 3 is a flow chart 300 describing an embodiment of a method of selectively cancelling paging messages for asynchronously arranged base stations 102*a-g*. The flow chart 300 is described from the perspective of the wireless communication system 100 and the page controller 110 or MME. The method begins when there is an indication 302 that the mobile station 106 needs to be located within the cells 104*a-g*. Such an indication can be because a call is being made to the mobile station 106. The page controller 110 therefore transmits 304 a page request message to the plurality of base stations 102*a-g*, which are asynchronous to one another, for which it is responsible. In an embodiment, other page controllers can send page request messages to other base stations in order to locate the called mobile station. Upon receipt of the page request message, the plurality of asynchronous base stations 102*a-g* will schedule 306 paging messages to be sent within the paging interval t and the paging messages will be sent 308 within the cells 104*a-g* to locate the mobile station. If necessary a repaging message will be sent by the base stations 102*a-g* if no response is received by the mobile station.

The mobile station 106 will respond 310 to a paging or repaging message with a paging response message to the appropriate base station 102*a-g* when it is one of the cells 104*a-g*. When the page response message is received, a notification will be provided 312 to the page controller 110 that the mobile station has been located. Upon receipt of notification, the page controller or MME will send 314 a page cancelling message to the base stations 102*a-g* that indicates that mobile station has been located and that there is no longer a need to continue to send paging messages to locate the mobile station by the asynchronous base stations. In response to the page cancelling message, the base stations 102*a-g* will cancel 316 the next paging or repaging message that is scheduled to be sent. In an embodiment, the base stations 102*a-g* may not cancel paging or repaging message under given circumstances including that the paging area within which the base station is operating is smaller than a given threshold, e.g. has fewer than a given number of cells in which there is no significant benefit from cancelling transmitting paging messages, In another embodiment, the base stations 102*a-g* may not cancel transmitting a paging or repaging message when the paging message is received late in the paging interval 202. Thus, if the page cancelling message is received in more than 0.5 t, the base stations can ignore the page cancel message because the most paging messages are sent in less than 0.5 t sec. In either of these described scenarios where the page cancelling message is ignored, the number of paging messages that are saved from being sent is less than a given threshold.

Figure 4:
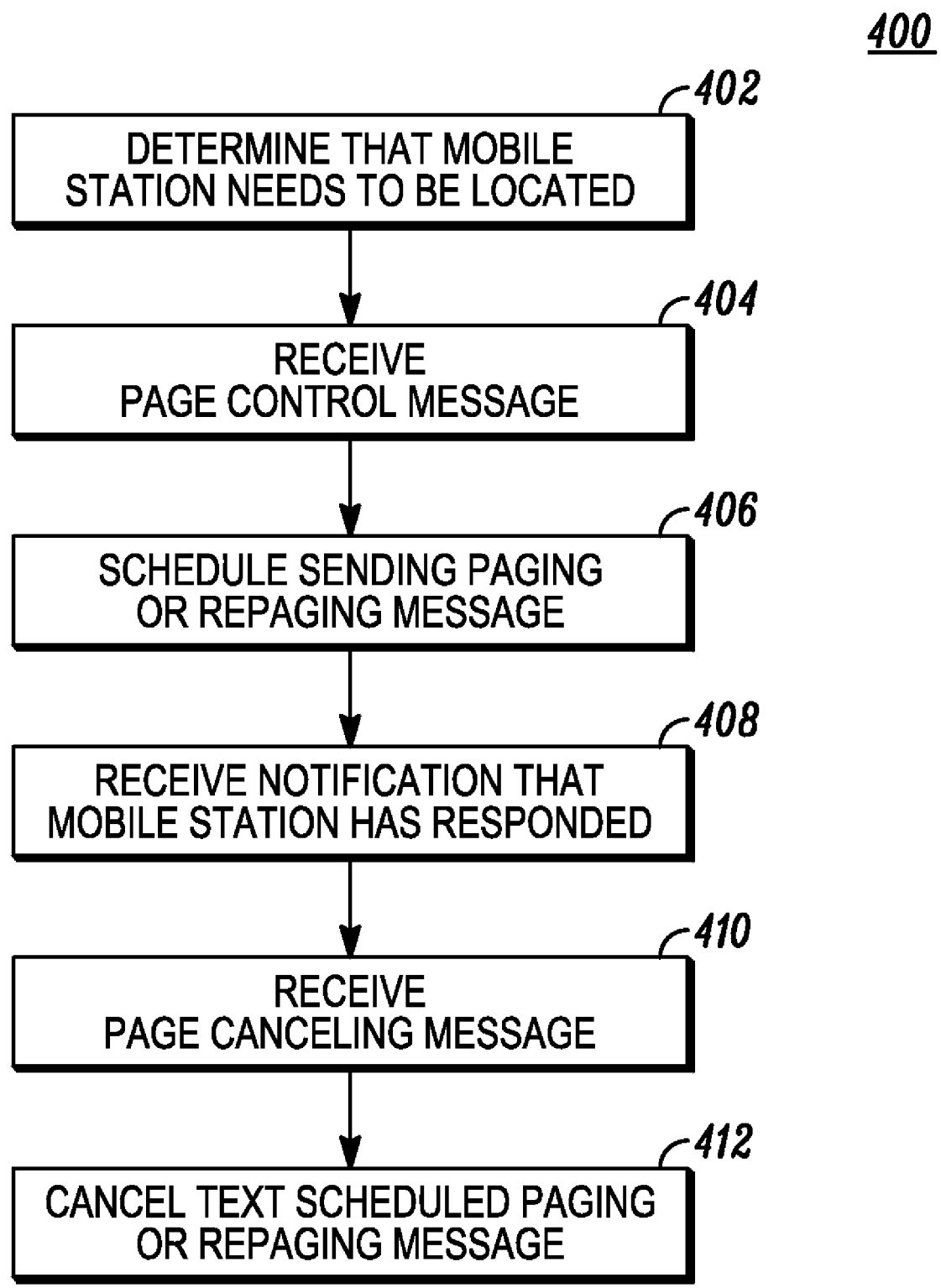
FIG. 4 is a flow chart illustrating the operations of a method pursuant to another embodiment of the present invention.

FIG. 4 is a flow chart 400 describing an embodiment of a method of selectively cancelling paging messages for asynchronously arranged base stations 102a-g. The flow chart 400 is described from the perspective of one of the plurality of asynchronous base stations 102a-g operating within the wireless communication system 100. The process of cancelling paging messages begins when it is determined 402 that the mobile station needs to be located. As such, the base stations 102a-g receive 404 a page control message indicating that the base station needs to locate the mobile station 106. The page control message is sent by page controller 110 or the MME. The base stations 102a-g then schedule 406 sending paging messages in an attempt to see if the mobile station 106 is in one of the respective cells 104a-g. The paging messages are scheduled to be sent within a paging interval 202. In an embodiment, the paging message is scheduled in the present paging interval, but it can be sent in the next paging interval if necessary. In addition, the base stations 102a-g can schedule repaging messages if the mobile has not responded to any of the initial paging messages. The base stations 102a-g will continue to schedule transmitting paging and repaging message upon receipt of additional page control messages.

The page controller 110 will receive notification 408 when the mobile station 106 has been located in one of the cells 104a-g. The base stations 102a-g will then receive 410 a page cancelling message from the page controller. The page cancelling message indicates to base stations 102a-g that the mobile station 106 has been located in one of the cells 104a-g and no more paging messages need be sent in the paging interval 202. Upon receipt of the page cancelling message, the base stations 102a-g will cancel 412 the next scheduled paging or repaging message in the paging interval 202 so that paging will cease for mobile station 106. In an embodiment, the base station will ignore the page cancelling message if the paging area in which the base station 102a-g is in is relatively small and less than a given threshold where most paging messages will have already been sent. In another embodiment, the base station will ignore the page cancelling message if the page cancelling message is received after a given time within the paging interval 202. For example, if the page cancelling message is received in less the 0.5 t the base station will cancel the next scheduled paging or repaging message, but the next paging message will not be cancelled when the great than 0.5 t.

As described earlier, in asynchronous base stations, paging messages can be sent at 0.5, 1.0, 1.5, 2.0 etc. secs. after the start of a paging interval of 4.0 secs. As the base stations are asynchronous, the paging messages will be sent out at various times from the different base stations. The purpose of the page cancelling message is to avoid sending too many unnecessary paging messages. If the page cancelling message indicating that the mobile station has been located is received by a base station after most paging messages have been sent, not sending the paging messages does not provide the added benefit. It has been found that the threshold is to be approximately 0.5 of the paging interval.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A method comprising:
   transmitting a paging request message to a plurality of base stations wherein one of the plurality of base stations is asynchronous to another of the plurality of base stations;
   receiving notification that a mobile station has responded to a page sent by at least one of the plurality of base stations within an interval of time that is less than a paging interval of the mobile station, and
   transmitting a page cancelling message to the plurality of base stations in response to the notification, wherein transmitting the page cancelling message occurs when receiving the notification occurs within the interval of time that is within at least one half of the paging interval and further, wherein transmitting the page cancelling message does not occur when receiving the notification occurs after the interval of time.

2. The method of claim 1 wherein transmitting the page cancelling message does not occur when receiving the notification occurs after at least one half of the paging interval.

3. The method of claim 1 further comprising cancelling pages sent from the plurality base station to the mobile stations.

4. The method of claim 1 further comprising not cancelling pages sent from the plurality of base station to the mobile stations when the number of cancelable pages is less than a threshold.

5. The method of claim 1 further comprising the plurality of base stations not sending a repage message to the mobile station in response to receiving the page cancelling message.

6. The method of claim 1 wherein transmitting the page cancel message occurs when the number of cells within a paging area is greater than a threshold.

7. The method of claim 1 wherein the base station does not perform base station based repaging.

8. The method of claim 1 wherein the page cancelling message includes one of identifying information of the page request message and identifying information of the mobile station.

9. A method comprising:
   receiving a page control message instructing at least one of a plurality of asynchronous base stations to send a paging message to a mobile station;
   receiving a page cancel message instructing the at least one of the plurality of asynchronous base station to cancel sending the paging message to the base station;
   cancelling sending the paging message to the mobile station, when the page cancel message is received within a time interval which is less than at least one half of a paging interval of the mobile station; and
   ignoring the page cancel message when the page cancel message is received after the time interval.

10. The method of claim 9 wherein the paging message is a repage message.

11. The method of claim 9 wherein the page control message and the page cancelling message are received from a page controller.

12. The method of claim 9 further comprising sending paging message to the mobile station after receiving page control message.

* * * * *